United States Patent [19]

Bokenkamp

[11] 3,934,647

[45] Jan. 27, 1976

[54] PIPE LAYING SYSTEM

[75] Inventor: Donald G. Bokenkamp, Houston, Tex.

[73] Assignee: Dolphin International, Inc., Houston, Tex.

[22] Filed: June 21, 1974

[21] Appl. No.: 481,536

[52] U.S. Cl. .................................... 166/.5; 61/72.3
[51] Int. Cl.² ......................................... E21B 43/01
[58] Field of Search ................. 166/.5, .6, 77, 77.5; 61/72.3; 175/5

[56] References Cited
UNITED STATES PATENTS

| | | | |
|---|---|---|---|
| 3,226,728 | 12/1965 | Walvoord | 61/72.3 X |
| 3,352,356 | 11/1967 | Wakefield | 61/72.3 X |
| 3,595,312 | 7/1971 | Matthews | 166/.5 X |
| 3,658,270 | 4/1972 | Slator et al. | 166/77 X |
| 3,729,941 | 5/1973 | Rochelle | 166/.6 X |
| 3,797,570 | 3/1974 | Leutwyler | 166/77 |

*Primary Examiner*—Frank L. Abbott
*Assistant Examiner*—Richard E. Favreau

[57] ABSTRACT

The system herein involves interconnection of an underwater well head assembly with a central gathering platform in an ocean or sea environment. A drilling vessel for drilling a well peripherally disposed with respect to the central gathering platform has capacity for forming and/or containing continuous lengths of production pipelines on spools or reels located adjacent to its drilling derrick. The charging of the spools or reels with continuous production pipelines can be accomplished simultaneously with the drilling of the well by the drilling vessel. Alternatively, production pipeline can be loaded on a reel and transported separately to the drilling vessel. At any desired time before or when drilling is completed and prior to the installation of the underwater well head, cable means are extended from a spool or reel on the gathering platform and coupled to an exposed end of a spooled production pipeline. A cable extends through a depending "J" tube or other suitable device on the central gathering platform so that the end of the pipeline attached to the cable can be drawn to a position along the ocean floor and through the J tube to the gathering platform. Each of the production pipelines to be connected as well as the electrical cable assembly are thus extended between the drilling vessel and the gathering platform. The extended production pipelines at the drilling vessel site are cut so that these cut ends can be attached under the derrick to the underwater well head assembly. The well head assembly with the interconnected production pipelines is then lowered vertically through the water from the drilling vessel while the slack in the pipelines is taken up by pull on the pipeline at the production platform. Another cable can be connected to an anchor or tug and to the well head for providing counter, opposing forces to maintain the descent of the well head vertical until the underwater well head site is reached. Means are provided in connection with the spooling device on the drilling vessel for straightening the production pipeline as well as feeding it relative to the spooling reel.

21 Claims, 14 Drawing Figures

PIPE LAYING SYSTEM

BACKGROUND OF THE INVENTION

The present invention relates to a system in ocean or sea environments for lowering an underwater well head assembly to an underwater well head site while simultaneously extending the associated production pipelines to a central gathering platform. More particularly, this invention relates to such a system for preparing production pipelines and for laying such pipelines between a drilling vessel and a gathering platform in a given time frame which is coextensive with the time frame for drilling of the well. Further, in another time frame, the invention involves coextensively lowering a well head assembly to a well completion position from a drilling vessel with the extension of the associated production pipelines from the well head assembly to the gathering platform.

It is not uncommon in offshore well operations that a central gathering platform is erected at the center or hub of a number of peripherally located wells. The gathering station serves the function of collecting the inputs from the various underwater wells to gather sufficient storage quantities until transfer to a tanker vessel is desired. Alternatively, the storage quantities can be channelled by a large flowline to a land facility or to another oil storage facility in the area.

Heretofore, it has been the practice to complete the peripheral underwater well and, upon completion, install the underwater well head assembly from the drilling vessel. The drilling vessel then is moved off-site to another location while production pipeline laying equipment is moved into position for laying the production pipeline. After laying the pipeline, it is connected underwater to the well head assembly and connected to the gathering platform. These sequential operation functions involve a loss of utility and time for the drilling function of the drilling vessel as well as a time delay in the inputting of production from the well to the gathering station.

The present invention contemplates (1) the preparation and laying of the production pipelines in a time frame coextensive with the drilling of the well and (2) the lowering of a well head assembly with the interconnected pipelines so that a considerable saving in time results which is translatable into decreased costs and production at a much earlier point in time.

SUMMARY OF THE PRESENT INVENTION

In the operation of the system of the present invention, there is employed a central gathering platform which has depending J tubes through which a number of production pipelines can be passed. A drilling vessel at a peripheral location relative to the gathering platform has capabilities for drilling a well and for lowering a well head assembly to the ocean floor. The method invention is characterized in the steps of extending continuous lengths of production pipelines from the drilling vessel to the gathering platform, the coupling of the production pipelines to the well head and the taking up of the slack in the other end of the pipelines at the gathering platform while vertically lowering the well head assembly so that the well head assembly is positioned on the ocean floor at the time that the other ends of the production pipelines are connectable to the gathering platform. The apparatus is characterized by structure for forming and spooling continuous lengths of production pipeline and for unspooling such production pipelines. The forming structure is pivotal between a spooling position for receiving pipeline on the vessel and an unspooling position for unspooling production pipeline vertically from the vessel.

In more detail, the present invention involves simultaneous preparation of a production pipeline for laying between a peripherally located offshore well and a central gathering platform while the well is being drilled by a drilling vessel. During the drilling operation, a continuous length of production pipeline is spooled on a reel and disposed on a drilling vessel. Prior to, or at the time of installation of a well head assembly, the production pipelines are extended between the drilling vessel and the gathering platform. This is accomplished by unloading the production pipeline from its reel and use of a chain or cable extending between the gathering platform and the drilling vessel. The ends of the production pipelines are coupled to the well head assembly. The well head assembly and the attached production pipelines are then lowered to the underwater well head site while the slack in the production pipelines is taken up by the pulling of the production pipeline from the gathering platform. Thus, the well head assembly is disposed on an underwater location at the same time as the production pipeline is ready for final connection to facilities at the appropriate location at the gathering platform.

A continuous string of production pipeline is formed by welding ordinary joint lengths end to end on the vessel while driving the spooling reel with a hydraulic power means. A feeding device is located in front of the spooling reel to provide a level wind and to exert a straightening effect upon discharge of the pipe from the reel. The straightening device also has driving means and the entire device is movable between a loading position on the drilling vessel and a position where the pipeline can be discharged vertically into the water. An alternate material in the form of a flexible pipe formed of plastics and steel may be substituted for the welded steel pipe.

BRIEF DESCRIPTION OF THE DRAWINGS

FIGS. 1($a - d$) are schematic illustrations of the sequential steps of the method of the present invention to connect a pipeline on a well head to a gathering platform;

DESCRIPTION OF THE PREFERRED EMBODIMENT

Referring now to FIGS. 1a – 1d, these figures illustrate in schematic form a general system which embodies the concepts of the present invention. In FIGS. 1a – 1d, the number 10 indicates an offshore gathering platform which is disposed generally at a location which is the hub or central location for an oil production system and which receives inputs from peripherally located surrounding wells and sometimes from wells located on it proper. The gathering platform 10 has an upper surface 11 which is disposed above the level of water 12 and is supported by one or a plurality of legs 13 which secure it to the ocean floor 14 by suitable means. The gathering platform 10 may have oil or petroleum storage tanks as well as associated equipment to induct oil to its storage tanks and for transfer of fluid to tankers or directly to a pipeline to shore facilities.

The peripheral wells from which the hydrocarbons are produced and supplied to the gathering platform, typically, are drilled and completed by drilling barges or vessels. Following completion of such a well, a separate operation is usually performed to lay and connect a flowline between an underwater well head on the completed well and the gathering platform. In the present invention, the drilling barge or vessel 15 is cotemporaneously employed while a well is being drilled to arrange for the coupling of the drilled well to the offshore platform. Thus, as illustrated, in FIGS. 1 (a – d) at a distance from the gathering platform 10 is a semi-submersible or other type of drilling platform or vessel 15 which is capable of performing drilling operations of an underwater well.

On the drilling platform 15, the usual drilling operations conducted to drill a well bore 17 into the subsurface strata 14 below the water involve a riser and drilling string 16 which are employed in the development of a well 17. While the well 17 is being drilled, sections 18 of pipe or production tubing are being connected in a end-to-end relationship to form a continuous production pipe and the continuous pipe 20 is spooled on a spooling drum 19 on the platform 15. The amount of production pipe 20 spooled on the drum or reel 19 is preferably about that exact length which is necessary to extend from a well head of the underwater well to the surface of the gathering platform 10.

Figure 1A:
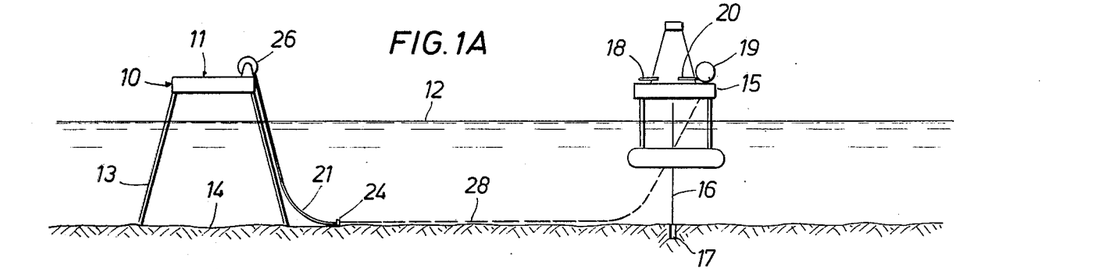

Referring back to gathering platform 10, a tubular J tube or pipe 21 extends vertically downward from the upper surface 11 of the platform and has with a radius of curvature adequate to situate its terminal opening 24 along the ocean floor 14 and to accommodate the passage of a pipeline therethrough. From a spool 26 on the gathering platform, a cable or chain 28 (shown in dashed lines) extends through the J tube 21 and is connected at its other end to the drilling platform 15. For ease of operation, rollers (not shown) or the like, can be disposed along the length of the J tube to facilitate passage of the cable and pipeline therethrough. The cable 28 may be towed to the drilling platform 18 from the gathering platform 10 by a tug at any suitable point in time prior to the completion of the well 17.

Figure 1B:
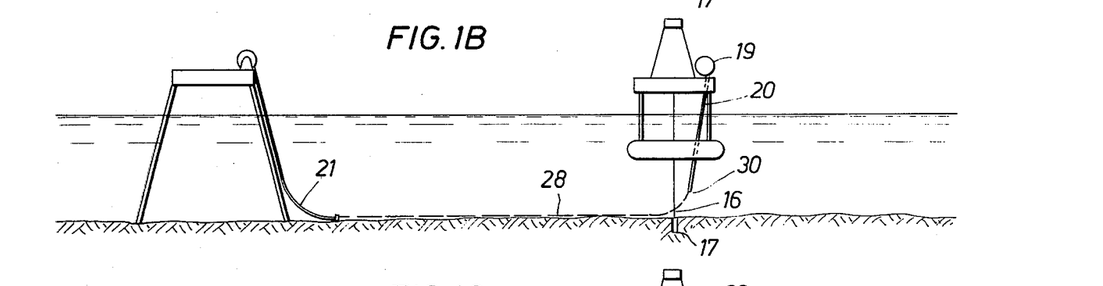
Figure 1C:
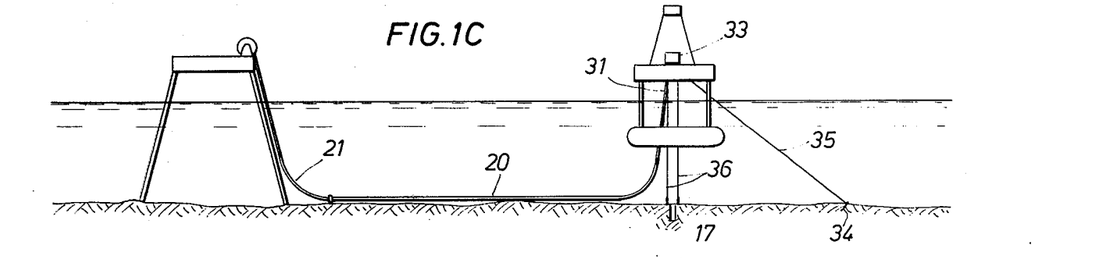

As shown in FIG. 1b, while the drilling operation for the well 17 is in progress, the cable 28 from the gathering platform 10 is attached, as shown at the number 30, to the exposed end of the spooled production pipeline 20 on the drilling platform 15 and the production pipeline 20 is directed downwardly from the drilling platform reel 19 on the drilling barge. Next, the pipeline 20 is pulled over the ocean floor until the exposed end of the production pipeline 20 is guided into the underwater open end of the J tube 21 at the gathering platform. All of the pipelines for the operation are similarly spooled and subsequently extended between the drilling vessel and the gathering platform. When the drilling is completed and the installation of the well head is the next step, the ends 31 of the pipeline are attached to a well head 33 (See FIG. 1c). An anchor 34 and cable interconnection are provided to counterbalance or offset the lateral forces involved in lowering the well head 33 with attached production tubings to the well 17 at the ocean floor so that the well head has a substantially vertical descent. As is customary, conventional guidelines 36 and associated means extending between the surface vessel and underwater well site provide vertical guiding functions for the well head assembly.

Figure 1D:
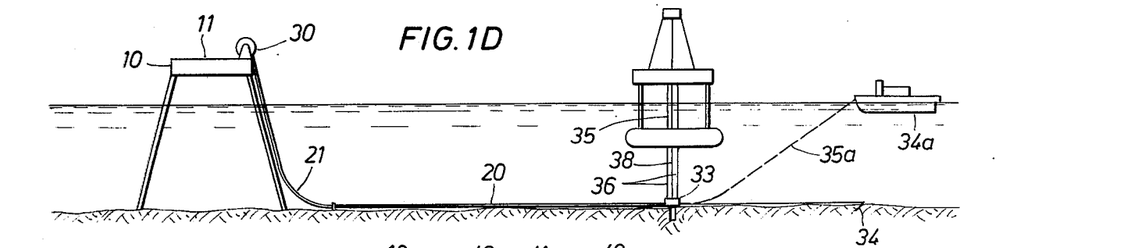

As shown in FIG. 1d, the well head 33 and attached production tubings 20 are lowered by a cable or pipe system 38 so that the well head 33 can be attached or coupled to the drilled well 17 in a conventional manner. At the same time that the well head 33 is being lowered to the well head site, the exposed end 30 of the production pipeline in the J tube can be drawn toward the upper surface 11 of the gathering platform 10. Thus, at the time the well head 33 is in position to be attached to the well 17 at the ocean floor, the exposed end 30 of the production pipeline can be attached to the gathering platform facilities and production of the well can be immediately commenced. As an alternative to the use of an anchor 34 and cable 35, a cable 35a and tug 34a can be used to provide an off-setting force.

In summary of the system, while a well is being drilled, the drilling vessel is used to prepare or receive a continuous length of production pipeline for connecting the underwater well head to a remotely located gathering facility. Before the drilling of the well is completed, the production pipelines are extended to the gathering platform and the end of the pipeline at the drilling vessel are prepared for connection to the well head. Upon completion of the well, the pipelines and well head are interconnected at the drilling vessel. While the well head and connected pipelines are being lowered into position on the underwater well site, the remaining ends of the pipelines are pulled onto the gathering platform. Thus, at the time the well head is coupled up for production with the well, the well is also connected to the gathering platform. The semi-submersible drilling vessel 15 is used not only for drilling the well, but also for laying the subsea production pipeline 20 to the central gathering platform 10 and the operations for accomplishing these functions are coextensively performed thereby providing efficient operation.

Figure 2:
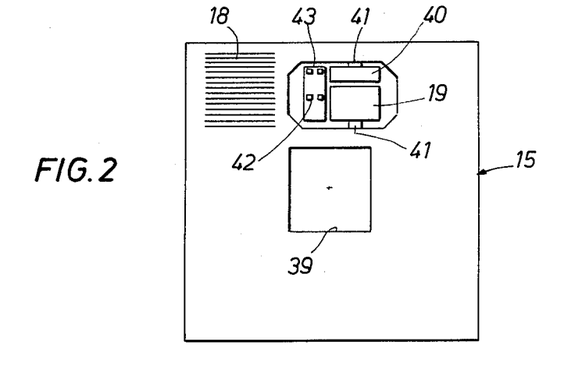
FIG. 2 is a top or plan view to illustrate the location of the pipeline spooling device relative to the drilling derrick.

Referring now to FIG. 2, a top or plan view in schematic form illustrates a drilling vessel and a centrally located drilling rig derrick 39. A reel 19 for the production pipeline is generally located to one side of the rig 39 at the midsection of the drilling vessel. Sections of production pipeline 18 can be connected end-to-end from a pipe rack and spooled onto the reel 19. The reel 19 is located adjacent to the derrick 39 so that the end of the production pipeline on the spool can be pulled easily to a connection point with a well head in the rig derrick 38.

In connection with the pipe reel 19, there is another reel 40 on the same horizontal axis 41 and this second reel 40 has a lesser width than the reel 19. The reel 19 is used for coupling lengths of smaller diameter tubing for forming a pressure line for pumping through flow line tools. Associated with each of the reels 19 and 40 are pipe feeding devices 42 and 43 which can feed pipe to a reel, draw pipe from a reel and straighten the pipe as it is pulled and drawn to and from a reel. Each of the pipe feeding devices 42 and 43 is mounted and arranged for traverse relative to the reel for level winding of the pipe on the reels. While the reel 40 is described in connection with smaller diameter tubing, the reels and pipeline sizes for each of the reels 19 and 40 can be the same if so desired.

Figure 3:
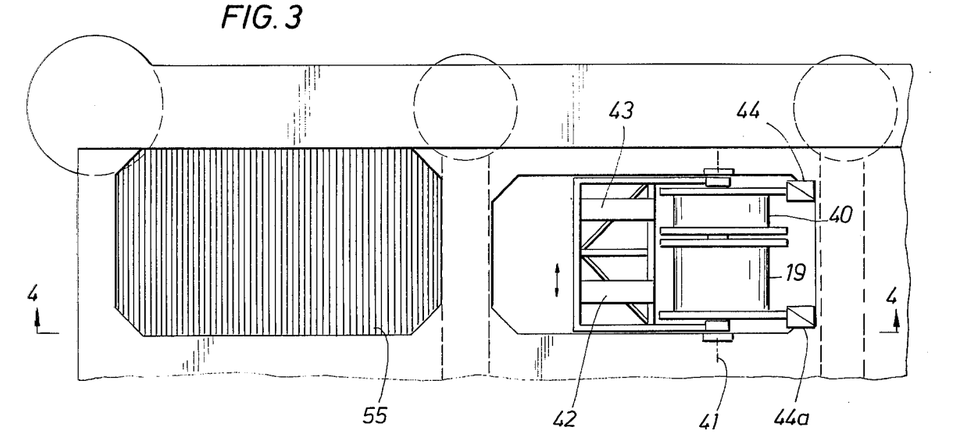
FIG. 3 is an enlarged view of FIG. 3 illustrating the pipe reeling mechanism.
Figure 4:
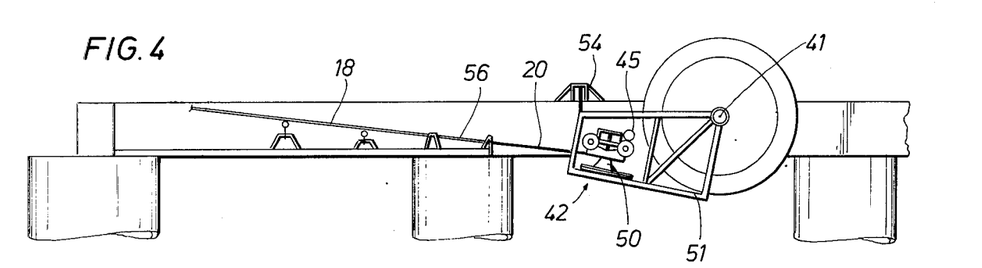
FIG. 4 is a view taken along line 4—4 of FIG. 3.

As shown in FIGS. 3 and 4, in larger detail, the reel system includes at least two spools or reels 19 and 40 disposed in a side-by-side relationship on a common axis 41. Each reel can be independently rotated by independent hydraulic motor means 44 and 44a or the reels can be jointly driven, if desired. The widths of the reels can be different if the smaller reel is intended to carry pipe or conduit for hydraulic control fluid or flow through tools which do not require as large of diameter as the pipe or conduit used for flow of production fluids. The reels 19 and 40 are supported along a single shaft axis 41 and the independent driving means 44 and 44a are provided for independent rotation of the spools. The driving means 44 and 44a can be hydraulic motors which can provide the required torque to move a pipe relative to the spool or to provide braking forces where necessary.

Figures 5, 6:
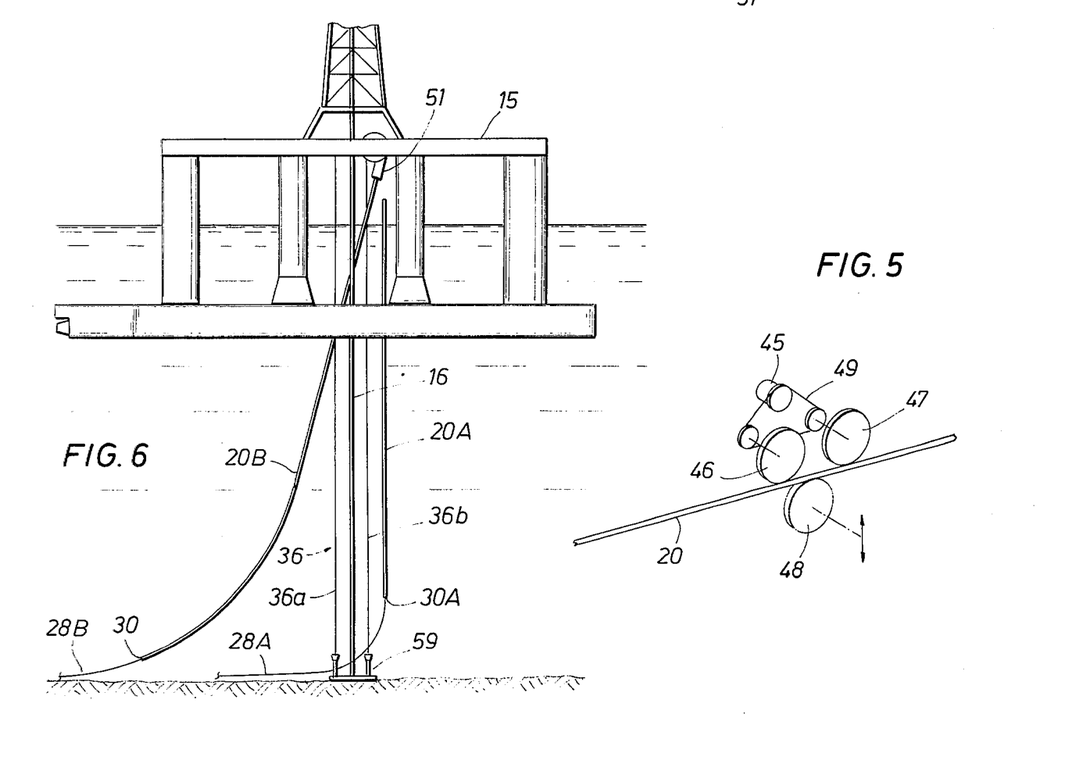
FIG. 5 is a schematic illustration of pipe feeding means for the reel.
FIG. 6 is a view illustrating the first steps involved in extending a pipeline from the drilling vessel.

The pipe feeding devices 42 and 43 also serve as straightener and aligner structures. A typical feeding device is shown in FIG. 5 and includes forward and rearward grooved rollers 46 and 47 and an intermediate, lower roller 48. The forward and rearward rollers 46 and 47 are arranged for location above a pipe 20 while the intermediate roller 48 is arranged for location below the pipe. The spacing between the upper set of rollers and the lower roller is such that the pipe length can be longitudinally passed through the rollers and frictionally driven or moved by rotation of the rollers. A hydraulic driving motor mechanism 45 and a chain drive 49 is used to provide driving torque for the forward and rearward rollers of a feeding device. The entire group of rollers are mounted in a frame 50 (See FIG. 4) which, in turn, is mounted for a traverse movement on a base support 51. The base support 51 is pivotally mounted with respect to the axis 41 of the reels. The pipe feeding devices are mounted on the pivotal base support 51 in such a manner that they can be moved in a direction lateral to the open face of a spool. This permits a level wind of the pipe on a spool. Conventional driving means (not shown) can be provided for reciprocating the feeder device frame relative to the base support for the level wind function.

A control position mechanism 54 is attached between the base support 51 and the vessel to maintain the base support 51 in the position shown for loading of pipe on a reel. When the base support 51 is tilted about the spool axis 41 from the position shown in FIG. 4 to a near vertical pipe unloading position as shown in FIG. 6, a similiar position mechanism (not shown) is used to lock the base support in position. The base can be pinned at various discrete angles between 65° and 90° from a horizontal for unloading of the pipeline from the reel.

As shown in FIG. 4, a production pipe 20 typically is formed from pipe sections 18 located on a pipe loading rack 55. The pipe sections 18 can be moved by a crane (not shown) to a position for end-to-end welding, for example, at the location 56. X-raying, pressure testing, and joint coating can also be done at this station. Grinding of the weld bevels can be done on the pipe rack. After a weld is made, a sizing drift can be run from the open end of the joint to check for icicles and other obstructions. The continuous length of pipe is spooled on the reel by the application of hydraulic power to the reel. Back tension is held on the pipe by using the feeder rollers 46 and 47 as a brake and this keeps the wraps of pipeline tight on the reel. In the position illustrated in FIG. 4, the straightener rack 51 is in a raised position relative to the platform and this position is used to spool the pipe upon the reel. After the proper length of pipe is welded and charged on the reel, the pipe can be hydrostatically tested on the reel and can be pigged both when filling the line with test water and when removing the water.

FIG. 6 illustrates schematically the system while drilling operations are in progress. The drilling string and riser system is shown by the number 16. In FIG. 6, the guide line system 36 which includes at least two cables 36a and 36b, is connected and extends vertically between the base 59 on the ocean floor and the drilling vessel 15. The cable 36 and 36b permit guiding of a well head to its underwater location on the ocean floor. In the initial operation, the exposed end 30a of the spooled production pipeline on the rig reel is attached to the cable 28a from the gathering platform, the designation 30a and 20a being used in FIG. 6 to illustrate the first position of the pipe 20. The reel and feeding device 42 on the support base 51 are arranged so that the pipeline issues nearly vertically downward from the vessel 10. In this position the frame 51 is vertically downward from the vessel 10. In this position, the frame 51 is rotated from the position shown in FIG. 4 to a position (not shown) where the pipeline can be unspooled and lowered nearly vertically through an opening in the vessel. Since the cable 28a is initially passed up through the vessel structure, it is not initially used to pull the pipeline from the reel because the cable could rise up and pull against the vessel structure. Thus, the pipe line is unreeled, and as the pipeline is unreeled, it is straightened by the feeding device 42. The main reel motor 44a is used to hold the pipeline tight on the reel by braking, or may be used in unreeling as required. The line is unreeled until its end almost reaches the sea floor. As mentioned before, the end of the pipe 30a is connected to the cable 28a which is on a reel 26 on the gathering platform. When the pipe is vertically lowered to near the bottom of the ocean floor, tension is applied to the cable 28a. The pipe can be unreeled by the drive supplied by the straightener rollers, or by the weight of the pipe if it is adequate (the drive then providing a braking effect).

From the initial position, as the pipe 20b is unreeled from the reel, the cable 28b draws the end of the pipeline toward the gathering station. Thus, the pipe assumes a curvature as shown at the left of FIG. 6. The designation 20b is used to designate the second position of the pipe 20 during the operation.

The pipeline 20 can be pulled by a tug (not shown) in addition to a winch 26 on the gathering platform. When the required length of pipe has been pulled, the other pipeline 40a on the reel 40 is unspooled and extended to the gathering platform in the same manner as pipeline 20 with another cable. If desired, the electrical control cable (not shown) can also be extended between the vessel and the platform at this time.

Figure 7:
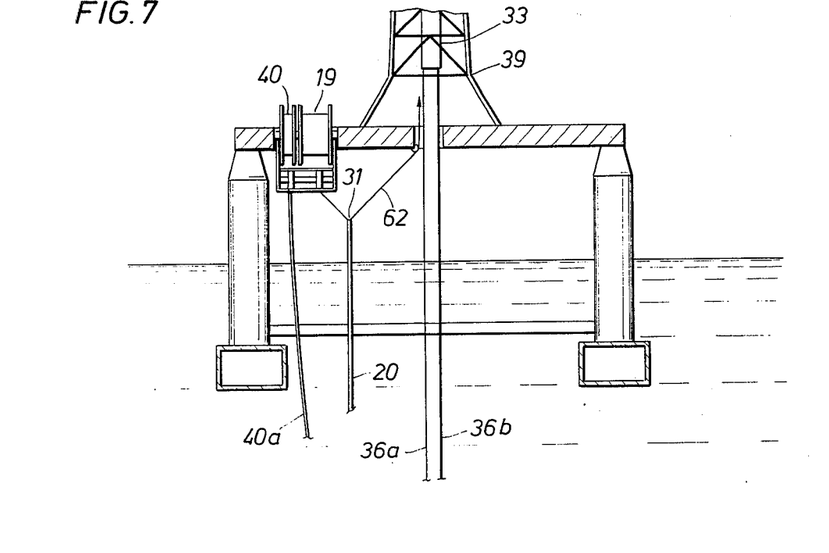
FIG. 7 is a view illustrating the step of connecting the end of the pipeline to a well head in the derrick.

Upon completion of drilling, the pipelines 20 and 40a are cut and transferred to the derrick for attachment to the well head. The electrical control cable (not shown) for the well head controls is also attached. The electrical cable has considerable flexibility and, hence it can be separately laid from a tug if desired. A cable 62 from the drilling rig is used to bring the end 31 of the pipeline under the derrick where it is attached or tied into a well head device 58 suspended in the derrick 39. As shown in FIG. 7, this shifts the location of the end 31 of the production pipeline from the reel 19 to a well head under the derrick. The pipeline 40a is similarly connected to the well head. Next, after the pipes 20 and 40a are connected to the well head 33 under the derrick, the connection can be hydrostatically tested before lowering the well head. For hydrostatic testing, the opposite ends of the pipelines are plugged. The well head 15, the pipelines 20 and 40a and the electrical control cable are thereafter lowered as a unit with the well head being guided by the guide line system 36. When the well head 33 reaches bottom, it is attached to floor well head connection.

While the well head 33 is being lowered, a cable 35 is threaded through the well head and extended between an offset anchor 34 and the derrick 39. The cable 35 is maintained taunt by pulling against the anchor 34 located in a direction opposite to the direction of the pull on the pipes 20 and 40a by the chain or cables 28.

Figure 8:
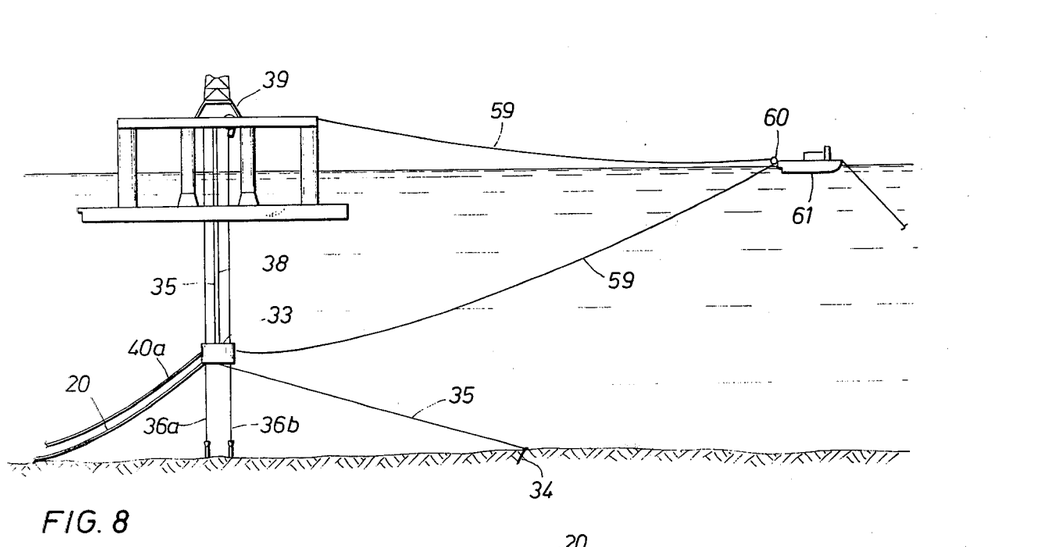
FIG. 8 is a view illustrating the step of lowering an attached well head and pipeline to a well site.

Also illustrated in FIG. 8 is a cable 59 connected to the well head 33 and to the drilling vessel and looped over a drum 60 on a tug 61. This is an alternate system for controlling the vertical descent of the well head.

Figure 9:
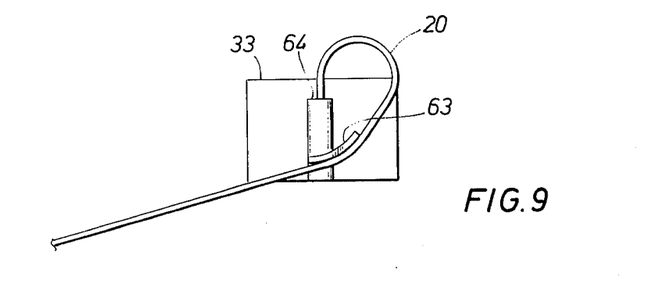
FIG. 9 is a view illustrating means on the well head for curving pipeline as it is lowered to a well site.

To allow the angle of the production pipes 20 and 40a to change relative to the well head assembly as it is being lowered, bending shoes, such as illustrated at 63, are installed in the well head assembly. Thus, a pipe section is curved about the shoe 63 as the shoe is lowered to the well head. This is illustrated in FIG. 9 where the pipe 20 curves with respect to a connection 64 on the well head and the bending shoe 63 is disposed in the radius of curvature. The radius of curvature of the pipeline increases and is controlled by the shoe 63 as the well head is lowered toward the ocean floor.

To control the stress in the pipeline, the tension in the pipeline and in the equalizing cable are measured at the well head assembly 33. The horizontal and vertical components of the pipeline tension can be determined by mounting the bending shoe on load cells (not shown).

Figure 10:
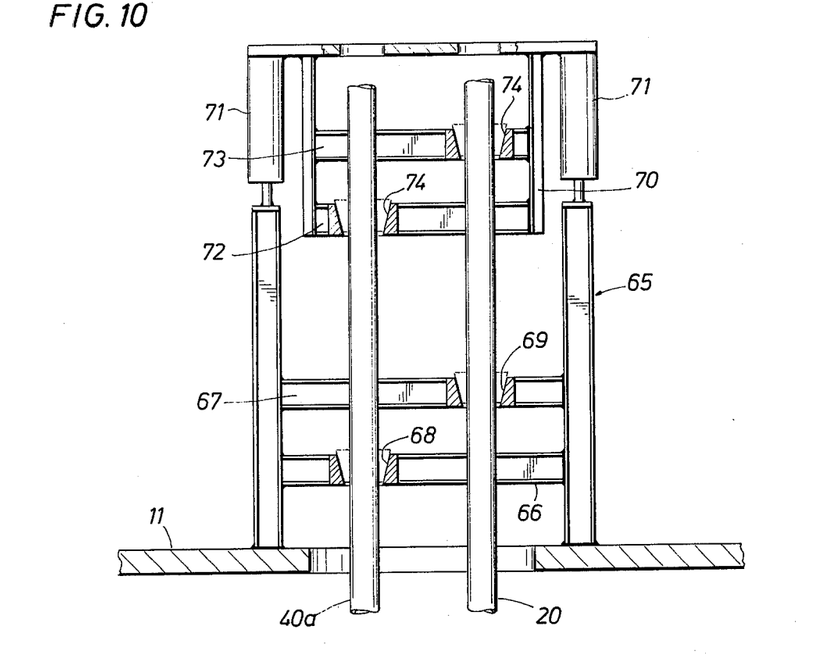
FIG. 10 is a view illustrating jacking mechanism which can be employed for positive movement of the pipeline.

While the well head and the attached pipelines are being lowered from the drilling vessel, the pipelines are being taken up at the gathering platform. To provide a more positive control than a winch and cable, the ends of the pipelines 40a and 20 can be received in the gathering platform before the well head descent is begun from the drilling vessel. As shown in FIG. 10, a jacking mechanism can be employed for positive movement of the pipelines while the well head is being lowered. The jacking mechanism 65 includes a frame 65a on the platform surface 11 which has transverse pipe supports 66 and 67. Each support respectively has a slip cone opening 68 and 69 through which the respective pipes 40a and 20 are passed. To hold the pipes against downward movement, conventional slip assemblies (not shown) are disposed in a cone opening and hold the pipe against downward movement. The slip assemblies are released by an upward pull on the pipe and can be reset or removed. To move the pipelines jointly or singly, an upper pulling assembly 70 is provided. The assembly 70 is vertically reciprocated by virtue of hydraulic power means 71. The assembly 70 includes transverse pipe supports 72 and 73 which similarly have cone opening 74 through which the pipeline extends. By use of conventional slip assemblies in the cone openings 74, the pipelines can be pulled through the lower openings and set. While the pipeline or pipelines are held in the lower openings, the upper openings are reset for another pulling operation. Thus, the pipelines may be pulled singly or in combination.

Figure 11:
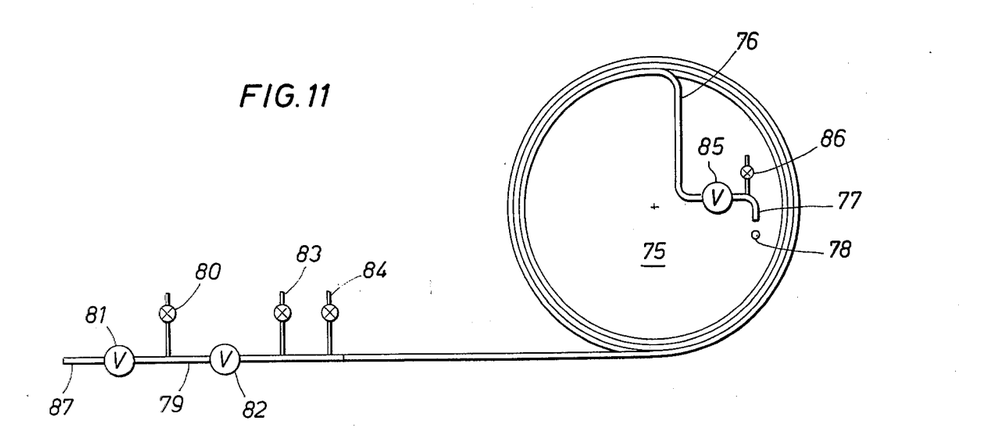
FIG. 11 is a view illustrating a system for hydrostatically testing the pipeline as it charged on a reel.

Referring now to FIG. 11, a system is illustrated for hydrostatically testing the pipeline as it is charged on a reel. When the pipe is initially started on a reel, a long radius ell 76 is welded to the pipe and passed through the reel hub or flange plate. The ell 76 is attached to a full opening gate valve 85 and a bleed valve 86 is connected to an open nipple 77. To fill the line with test water, a peg is inserted in an open nipple 77 at the reel end of the pipe. A tight fitting pig such as a spherical pig 78 should be used to minimize the leakage of water on air past the pig. A line (not shown) from a low pressure water source is then attached to the nozzle 77. The pig 78 is pushed ahead of the water as the line is filled. On the other end of the line a test head assembly 79 has been welded (or otherwise mechanically attached). This head includes bleed valves 80 and 81 to remove any collected air and to allow the pig to be run, a full opening gate valve 82 to allow the pig to pass out of the section to be tested, and valves 83 and 84 to be used as connections to pressurize the line and to monitor line pressure.

The pig 78 is pumped through the line with all of the valves open, except the bleed valve 86 at the reel end, until it hits the end cap 87. The end valve 87 is then closed and any air is bled out of the other three hand valves 80, 83 and 84. When all the air is bled off, the gate valves 82 and 85 are closed. The line is then pressurized through one of the small hand valves 83. A typical test would be to pressurize the line to 90% of its yield pressure and hold the pressure for one hour.

When the test is complete, the pig 78 and water are pushed back toward the reel by air pressure applied at the end bleed valve 87 with the gate valve 85 at the test assembly fully open. The gate valve 85 or the bleed valve 86 at the reel end is used to control the flow of the test water from the pipe and to seal the pipe after the pig has moved back far enough for the test assembly to be removed.

For the next test, the water source is reconnected, air is bled from the connection, and the initial test procedure is repeated. After all testing is complete, the water can be removed by running pigs from either end using air pressure.

The hydrostatic test of the pipe on the reel will be good insurance that the pipeline will perform satisfactorily after laying, because the reeling operation will tend to make laminations and slugs show up which might otherwise only show up after laying.

In summary of the system and apparatus, the present invention permits drilling to continue while a pipeline is being welded and loaded onto a reel and tested on the reel and while the pipeline is being pulled toward its connection point on a gathering platform. The pipeline is layed from near the center of the drilling vessel so that upon the event that one end of the pipeline reaches the connection point, the pipeline can be cut at the reel and passed to the derrick for connection to the well head. By use of separate reels, bundling of the two flowlines can be eliminated. The pipelines can be made up from normal joint lengths and loaded onto the reel during the drilling functions.

Further modifications and alternative embodiments will be apparent to those skilled in the act in view of this description, and, accordingly, the foregoing specification is considered to be illustrative only.

What is claimed is:

1. Apparatus for use in connecting production pipeline between one offshore location and an underwater well which is drilled from a drilling vessel, said apparatus including spool means for reeling a continuous length of production pipeline, said spool means being located near the midsection of a drilling vessel and proximate to the location of a drilling derrick,
   base supporting means carrying said spool means, said base supporting means being pivotable about a horizontal axis between a position for loading of pipe from a horizontal position onto the reel to a vertical position for unloading a pipeline from the reel, and
   pipe handling means disposed on said base means and arranged for level winding of pipe onto and from said reel.

2. The apparatus as defined in claim 1 and further including means for discretely positioning said supporting means in a number of positions relative to a horizontal.

3. The apparatus as defined in claim 1 wherein said number of positions extends between 65° and 90° relative to the horizontal for unloading of pipeline from the reel.

4. The apparatus as defined in claim 1 and further including power means for said spool means and power means for pipe handling means.

5. The apparatus as defined in claim 1 and further including a cable means associated with the offshore location, a J tube extendable from the offshore location, said cable means having a length extendable from said offshore location to said drilling vessel.

6. The apparatus as defined in claim 5 and further including well head means for attachment to one end of said production pipeline, said well head means having a guiding shoe thereon for producing a curvature of the production pipeline while the well head and attached production pipeline are lowered to the ocean floor.

7. A method for connecting one offshore location to at least one peripherally located production well upon completion of the drilling of the well from a drilling structure, comprising the steps of:
   extending a cable from one offshore location to a drilling structure for coupling with a free end of a continuous string of production pipe,
   coupling the free end of the production pipe to the cable,
   vertically extending the free end of the string of production pipe from the drilling structure to a location just above the underwater floor,
   exerting a pull on the cable to produce a curvature in the production pipe,
   extending the continuous string of production pipe from the drilling structure to said offshore location,
   bending the production pipe into a loop with respect to a wellhead connection to form a radius of curvature in the pipe,
   connecting a wellhead means on the drilling structure to wellhead connection on the continuous string of production pipe,
   lowering the wellhead means and attached production pipe from the drilling structure to the underwater floor well site while taking out the slack at the other end of the production pipe at said offshore location, and
   applying a counterbalancing force to the wellhead means in opposite direction to the pull of the cable or the wellhead means descends toward the underwater floor to offset the pull forces on the free end of the production pipe.

8. A method for offshore production operation where an offshore gathering platform location is connected to at least one peripherally located production well upon completion of the drilling of the well from a drilling structure, comprising the steps of:
   drilling an underwater well from a drilling structure,
   during the drilling function, forming a string of production pipeline in continuous length on powered reel on the drilling structure,
   prior to completion of the drilling function, extending the string of production pipeline vertically downwardly from the drilling structure,
   straightening the pipeline as it is vertically extended downward from the drilling structure,
   pulling the end of the production pipeline toward the gathering platform location while maintaining a back torque on the reel,
   upon the event of a desired length of production pipeline being pulled toward the gathering platform location,
   bending a loop in the pipeline relative to a wellhead connection,
   attaching the wellhead connection on the production pipeline to a wellhead suspended in a derrick in the drilling structure, and
   lowering the wellhead and attached production pipeline from the drilling structure to the underwater well site while taking out the slack in the pipeline while counterbalancing the pull of taking out slack in the pipeline so as to vertically lower the wellhead.

9. A method for connecting an offshore gathering location to at least one peripherally located undersea production well upon completion of the drilling of the well from a drilling structure, comprising the steps of:
   unspooling a continuous string of production pipeline from a spool on a drilling structure,
   pulling on the free end of said continuous string from another location spaced from said drilling structure while unspooling said continuous string,
   extending said continuous string between said drilling structure and said location until the length of said continuous string is such that it will extend from an operating surface of said location to an undersea production wellhead,
   on the drilling structure, connecting wellhead means to the other end of said continuous string of production pipeline, and
   lowering the wellhead means and attached production pipeline from the drilling structure to the undersea wellhead site while pulling on the other end of said continuous string of the production pipeline until the wellhead means is at the undersea production wellhead and the other end of said continuous string is at the operating surface of said location.

10. The method as defined in claim 9 and further including the step of applying a counterbalancing force to the wellhead means in a direction opposite to the pulling force as the wellhead means descends toward the undersea floor thereby offsetting the pull forces on the free end of the production pipeline.

11. The method as defined in claim 9 and further including the step of extending a pulling cable from the offshore gathering location to the drilling structure and coupling the free end of said continuous string of production pipeline to the cable, vertically extending said free end of said continuous string of production pipeline from the drilling structure to a location just above the undersea floor without taking a strain on said pulling cable, and when said free end of said continuous string is just above the undersea floor, exerting a pull on the cable to flex the depending production pipeline.

12. The method as defined in claim 11 and further including the step of applying a braking force to the spool to maintain the pipe wrap around the spool.

13. A method for offshore production operation where an offshore gathering platform location is connected to at least one peripherally located production well upon completion of the drilling of the well from a drilling structure, comprising the steps of:

drilling an underwater well at an underwater well site from a drilling structure, during the drilling function, forming a string of production pipeline in a continuous length on powered reel on the drilling structure, prior to completion of the drilling function, extending the string of production pipeline downwardly from the drilling structure from the powered reel to a location just above the underwater floor, then pulling the free end of the production pipeline toward a gathering platform location, upon the event of pulling a desired length of production pipeline toward the gathering platform location, attaching the other end of the production pipeline to a well head suspended in a derrick in the drilling structure, and lowering the wellhead and attached production pipeline from the drilling structure to the underwater well site while taking out the slack in the pipeline from the gathering platform location.

14. The method as defined in claim 13 and further including the steps of straightening the pipeline as it is vertically extended downward from the drilling structure, and maintaining a back torque on the reel.

15. The method as defined in claim 13 and further including the step of counterbalancing the pull of taking out slack in the pipeline so as to control the vertical lowering of the wellhead.

16. The method as defined in claim 13 and further including the steps of extending more than one string of pipeline between the drilling structure and the gathering platform and attaching all of the pipelines to the wellhead while it is suspended in the derrick and lowering all of the attached pipelines and wellhead as a unit.

17. The method as defined in claim 13 and further including the step of extending a cable from the platform location, connecting the cable to the free end of the spooled pipeline on the powered reel and using the cable to provide the pulling function on the free end of the pipeline.

18. The method as defined in claim 17 wherein said cable is guided downwardly from the platform location and generally horizontal to the underwater floor so that the pipeline can be extended along the underwater floor.

19. A method for connecting an offshore platform location to at least one peripherally located production well upon completion of the drilling of the well from a drilling structure, comprising the steps of:

extending a continuous string of production pipeline from the surface of a drilling structure to an offshore platform location spaced therefrom, in a first position, the length of said string being such as to extend between an underwater well site and the surface of said offshore platform where in a final position, said first position being such that the end of said string at said offshore platform is along the surface of the undersea floor and the end of the string at said drilling structure is at the surface of said drilling structure, connecting a wellhead at the surface of the drilling structure to the end of the continuous string of production pipeline, and lowering the wellhead and attached production pipeline from the drilling structure to the underwater well site while pulling on the other end of said string of production pipeline at said platform until said string reaches said final position where the wellhead is on the underwater well site and the other end of said string is at the surface of said offshore platform.

20. The method as defined in claim 19 and further including the steps of:

extending a plurality of strings of flow lines from the surface of the drilling structure to the offshore platform location, connecting said flow line strings to said wellhead at said drilling structure and simultaneously locating said flow lines and wellhead relative to the underwater well site and said platform by lowering said wellhead into its underwater position and taking up the slack in the flow lines at said platform.

21. The method as defined in claim 20 and further including the step of providing offsetting forces to the wellhead while it is being lowered to counteract the pull of the flow lines.

* * * * *